(No Model.)

N. W. CONDICT, Jr.
ABSORBER FOR ICE MACHINES.

No. 309,336. Patented Dec. 16, 1884.

Witnesses
James F. Tobin
John M. Clayton

Inventor
Nathan W. Condict Jr.
by his Atty's
Howson & Sons

UNITED STATES PATENT OFFICE.

NATHAN W. CONDICT, JR., OF JERSEY CITY, NEW JERSEY.

ABSORBER FOR ICE-MACHINES.

SPECIFICATION forming part of Letters Patent No. 309,336, dated December 16, 1884.

Application filed April 17, 1884. (No model.)

*To all whom it may concern:*

Be it known that I, NATHAN W. CONDICT, Jr., a citizen of the United States, and a resident of Jersey City, New Jersey, have invented certain Improvements in Absorbers for Ice-Machines, of which the following is a specification.

My invention consists of certain improvements, fully described and claimed hereinafter, in the construction of absorbing apparatus for ice-machines and refrigerators, my improvements having for their objects economy in the construction of the absorber, the exposure of an extended surface to the cooling influence of water, and the distribution of ammoniacal solutions and of gases evolved therefrom into the absorber in small jets.

Figure 6:
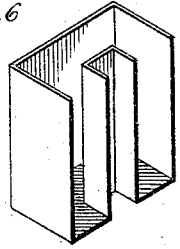
Figure 1:
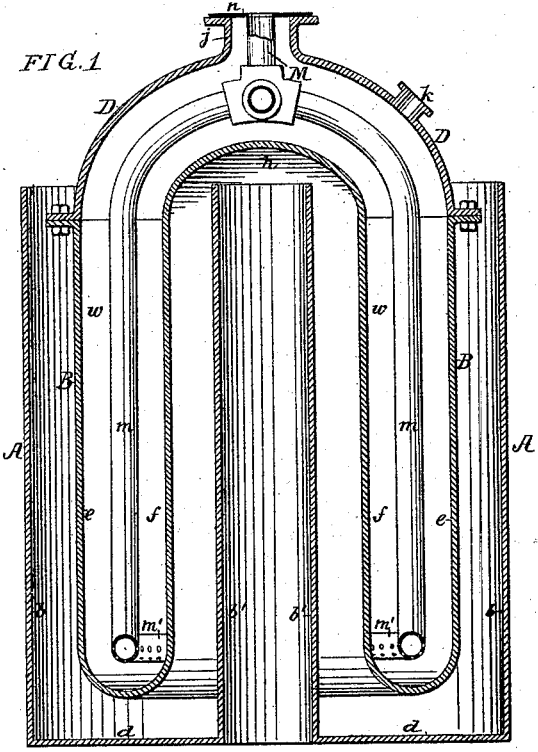
Figure 4:
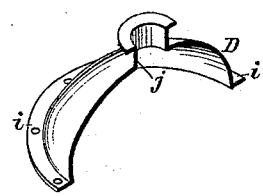
Figure 3:
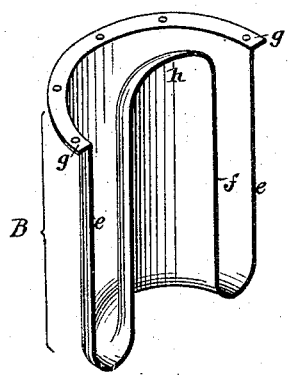
Figure 5:
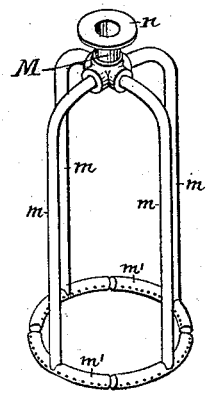
Figure 2:
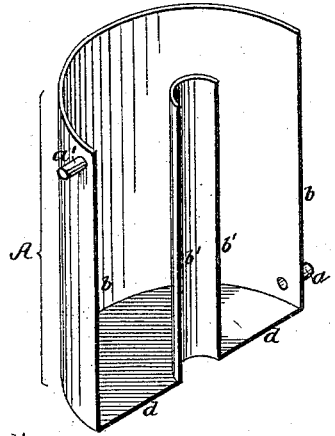

In the accompanying drawings, Figure 1 is a vertical section of the absorbing apparatus; Fig. 2, a sectional perspective view of the tank; Figs. 3 and 4, sectional perspective views of detached parts of the absorber proper; Fig. 5, a perspective view of the distributing-pipes, and Fig. 6 a sectional perspective view illustrating a modified form of absorber.

The tank A is in the present instance of the annular shape shown in Fig. 2, and consists of the outer casing, $b$, inner casing, $b'$, and annular bottom plate $d$, cold water being introduced at the inlet $a$, and being discharged at the outlet $a'$.

The absorber proper, which is suspended or supported in the tank in any suitable manner, consists of two parts—namely, the body B and cover D—which are constructed and adapted to each other in the peculiar manner shown in Figs. 3 and 4. The body B has an outer casing, $e$, terminating at the top in a flange, $g$, and at the bottom merging, preferably with a curve, into an inner casing, $f$, which is closed by the top $h$, the whole being cast in one piece, and the cover D having a flange, $i$, adapted to the flange $g$ of the body, and having at the top a neck, $j$. When the two parts of the condenser are secured by bolts passed through the flanges, they will inclose the space $w$, (shown in Fig. 1,)—that is, a space annular from the flange $g$ to the bottom and merging at the top into the neck $j$.

The object of this peculiarly-shaped absorber is the exposure of an extended area to the cooling influence of water circulated through the tank, both the inner and outer casings of the absorber being thus exposed. To attain this result it is not essential that the body of the absorber should be of the annular form shown in Fig. 3. It may, for instance, be of the quadrangular shape shown in Fig. 6, the cover and tank being made accordingly, or the body B may be many-sided; but in all cases it must have an inner and outer casing both exposed to water. An absorber of annular shape is preferred, as it is the most economical to make. A central pipe, M, has a flange, $n$, confined to the flange of the neck $j$ of the absorber, and with this branch communicate branches $m$, which extend first radially from the central pipe and then downward. There are four of these branches in the present instance, each terminating in a tubular perforated segment, $m'$, situated near the bottom of the absorber in which this system of distributing-pipes is suspended.

The manner of using the above-described absorber in connection with refrigerating apparatus is fully described in an application made by Thomas Rose, and bearing even date herewith; hence it will suffice to remark here that the gas evolved from ammoniacal solutions, as well as a solution weakened by being partly vaporized in a vacuum-chamber, is forced down the pipe M and distributed into the lower portion of the absorber in the condition of numerous small jets, the solution, strengthened by its union with the condensed gas, being withdrawn through a pipe, K, prior to being partly vaporized and returned to the absorber, and the liquid cooled by this vaporization being forced through refrigerating-pipes and returned to the condenser.

I claim as my invention—

1. An absorber having an inner and outer casing and composed of the body B, cast in one piece, and cover D, adapted and secured to each other, substantially as set forth.

2. The combination of a tank, through which water is circulated, with an absorber having an inner and outer casing, both of which are exposed to the water, substantially as specified.

3. The combination of an absorber having inner and outer casings, a tank through which water is circulated, and a system of pipes through which gas and ammoniacal solutions may be forced, and from which they may be distributed into the absorber near the bottom of the same, all substantially as set forth.

4. The combination of the absorber having inner and outer casings with the pipe M, branch pipes m, and perforated tubular segments m', substantially as described.

In testimony whereof I have signed my name to this specification in the presence of two subscribing witnesses.

NATHAN W. CONDICT, JR.

Witnesses:
OTTO CROUSE,
FRANCIS J. McGOWEN.